W. E. WILSON.
CUTTING DEVICE.
APPLICATION FILED SEPT. 13, 1917.

1,281,113.

Patented Oct. 8, 1918.

Inventor
Wesley E. Wilson,
By C. E. Humphrey
Attorney

UNITED STATES PATENT OFFICE.

WESLEY E. WILSON, OF AKRON, OHIO, ASSIGNOR TO THE AKRON RUBBER MOLD & MACHINE COMPANY, OF AKRON, OHIO, A CORPORATION OF OHIO.

CUTTING DEVICE.

1,281,113.  Specification of Letters Patent.  Patented Oct. 8, 1918.

Application filed September 13, 1917.  Serial No. 191,173.

*To all whom it may concern:*

Be it known that I, WESLEY E. WILSON, a citizen of the United States, residing at 751 Ardmore Ave., Akron, in the county of Summit and State of Ohio, have invented new and useful Improvements in Cutting Device, of which the following is a specification.

This invention relates to cutting devices primarily adapted for severing continuous or annular objects such as elastic vehicle tires into sections.

The object of the invention is to provide a machine for cutting either continuous or annular objects into sections and is especially adapted to be used in the production of segment shaped sections of an elastic vehicle tire for use as samples for advertising purposes or for specimens of a tire on which is displayed a trademark to comply with the statute requiring specimens of the goods with the trademark thereon.

The invention contemplates a carriage on which is mounted a form, means for clamping the object on the form, a rotary cutting tool which is adapted to sever the object into sections when the object carried by the form mounted on the carriage is brought into operative engagement therewith.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a front elevation of a cutting device embodying the present invention.

Figures 1, 2:
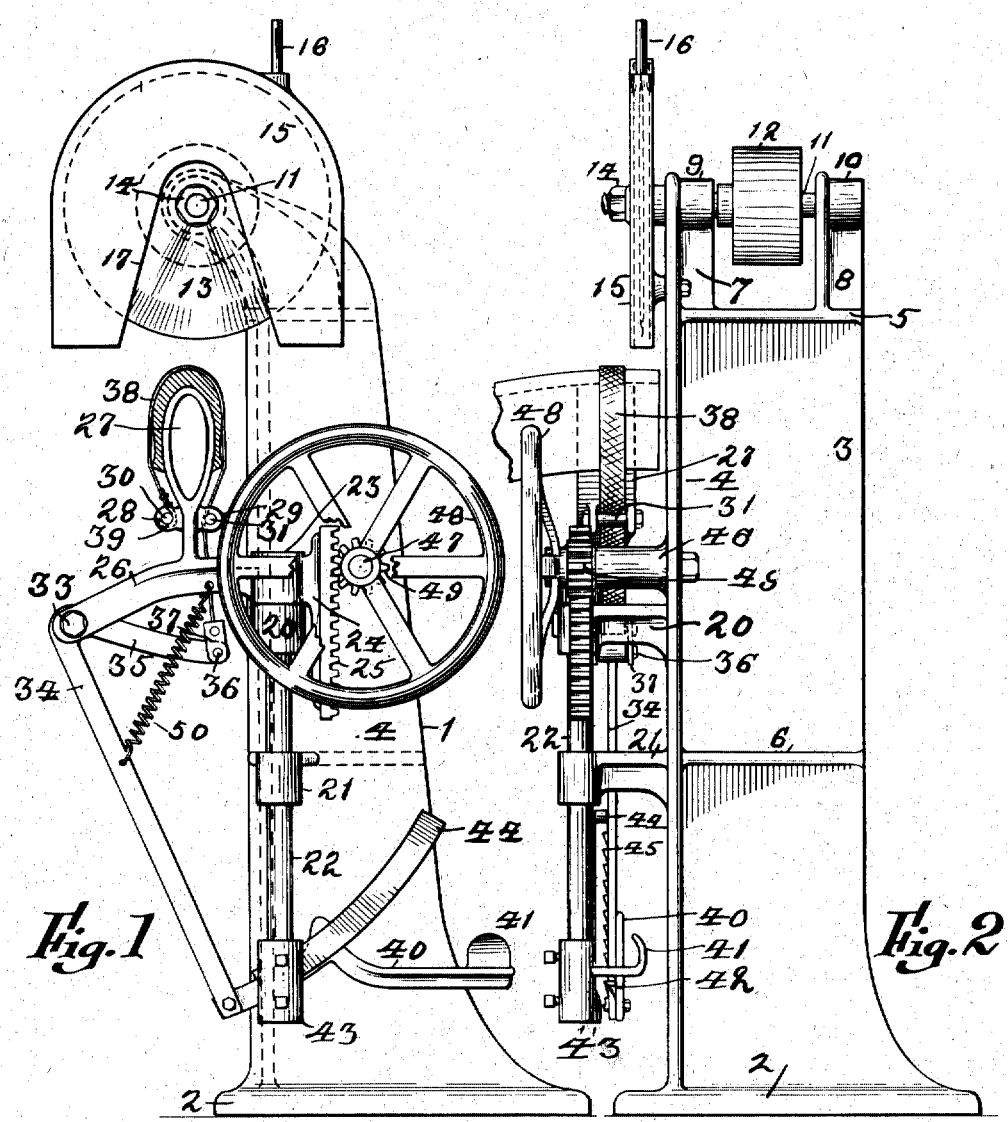
Fig. 2 is a side elevation looking from the right in Fig. 1.
Figure 3:
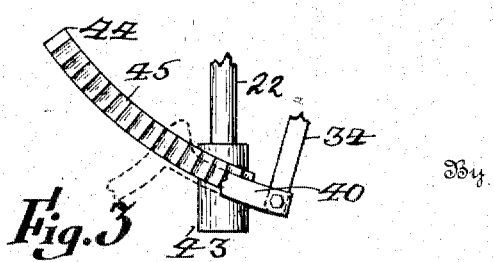
Fig. 3 is a detail of part of the mechanism shown in Figs. 1 and 2.

Referring specifically to the drawings the reference numeral 1 denotes a standard provided with a base 2 and preferably consisting of two right angularly positioned flanges 3 and 4 integrally formed and provided with integral webs or braces 5 and 6. Extending upwardly and laterally from the web 5 are two separated arms 7 and 8 in the outer ends of which are bearings 9 and 10. Mounted in the bearings 9 and 10 is a shaft 11 bearing a pulley 12 adapted to receive a belt for rotating the shaft 11. Mounted on the front end of the shaft 11 is a circular cutting knife or disk 13, which is held in position on the shaft 11 by means of a clamping bolt 14. Secured to the front face of the flange 4 by means of a clamping bolt is a hood or casing 15 inclosing the knife 13. This hood or casing is open at the lower portion and is out of contact with the cutting disk or tool 13 and is provided at the top with an inlet 16 through which water may be supplied to the knife during the cutting operation which is especially useful where the knife is employed in cutting vulcanized rubber. The front face of the casing 15 is provided with a centrally disposed notch 17 preferably V-shaped extending above the shaft 11 and which leaves space to permit the movement of the object to be severed into engagement with the cutting disk 13. Projecting from the front face of the flange 4 of the standard are two lugs 20 and 21 the outer ends of both of which are vertically apertured with the axes of the apertures in vertical alinement and in these apertures as bearings is mounted a nonrotatable shaft 22 on the upper end of which is a head 23 bearing an integral bracket 24 having rack teeth 25 on one face thereof. The toothed face of the bracket 24 is vertically disposed and is in parallelism with the axis of the shaft 22. Also integrally formed with the head 23 is a laterally-projecting arm 26 from which extends upwardly a form 27 provided on each side near the lower portion of the member 27 with pairs of ears 28 and 29 respectively and extending between the members of each pair of ears or pins 30 and 31 respectively. The upper portion of the form 27 is fashioned to constitute a seat for the interior of the object to be severed or cut and if the object to be severed is a tire or tire casing the outline or outer face of the form 27 will preferably conform substantially to the form of the interior thereof. As illustrated in the drawings the device is adapted for severing the outer casings of double tube pneumatic tire into sections and hence the form 27 is fashioned so as to readily receive an outer tube or tire casing of a double tube pneumatic tire when in its compressed condition. The outer end of the arm 26 is provided with a bolt 33 constituting a pivot for an L-shaped lever comprising a long arm 34 and a short arm 35 preferably formed integral. The free end of the arm 35 bears a pivot pin 36 on which is mounted a coupling 37 to which is connected a flexible strap 38 which is adapted to extend between the pin 31 and the side of the form 27 and from thence around the object on the form 27 and terminates in a hook-shaped member 39 which is arranged to engage the pin 30. Fixedly secured to the lower end of the arm 34 is an arm 40 provided with a pedal 41 for operating the L-shaped lever comprising the members 34 and 35. The arm 40 is provided with a projection 42 in the form of a dog or pawl. On the lower end of the shaft 22 is a boss 43 from which extends an arcuately formed arm 44 the rear face of which is provided with ratchet teeth 45 arranged to be engaged by the dog or pawl 42 when the pedal 40 is moved to its operative position. It may be pointed out that the arm 34 is capable of considerable lateral adjustment but the normal position of this arm is such as to cause engagement between the dog or pawl 42 and the teeth 45 of the arcuate arm 44 and hold the pedal 40 locked in its lower operative position and the pawl or dog 42 on the pedal 40 is released from engagement with the teeth 45 of the arm 44 by giving to the arm 40 a slight lateral movement. On the front face of the flange 4 of the standard 1 is a boss 46 in which is mounted a shaft 47 on which is a hand wheel 48 and also mounted on the shaft 47 is a pinion gear 49 so positioned as to intermesh with the rack teeth 25 on the bracket 24 so that when the hand wheel 48 is rotated the position of the shaft 22 and its connected mechanism is simultaneously shifted. Extending between the arms 26 and 34 is a coiled spring 50 for normally moving the arm 40 in its inoperative position which releases the strap 38 from its clamping operation on the object positioned on the form 27.

The operation of the device is as follows: If it is desired to cut an annular object such for instance as an outer casing of a double tube pneumatic tire into segment shaped sections the strap 39 is released from the pin 30 and the casing is then laid on the form 27 and the hook 39 reëngaged with the pin 30. The operator then presses down on the pedal 41 causing the strap 38 to clamp the object in position on the form 27. This downward movement of the pedal 41 causes the dog or pawl 42 to engage one of the teeth 45 on the arm 44 for holding the strap 38 in its operative clamping position. The cutting disk is usually constantly rotating by means of power applied to the pulley 12 and a supply of water is furnished through the inlet 16 thereto. The operator then revolves the hand wheel 48 which through the engagement of the pinion gear 49 with the teeth 25 of the bracket raises the shaft 22 causing the form to move upwardly to bring the object into engagement with the cutting knife 13. After the cutting operation the hand wheel 48 is reversely revolved lowering the shaft 22 and its connected mechanism. The operator then releases the arm 40 and pawl 42 from engagement with the teeth on the arcuate arm 44 in order to release the strap 38 from the clamping operation after which the tire casing is shifted a desired distance and the operation is repeated.

I claim:

A cutting device embodying a supporting standard, a rotatable shaft mounted therein, a circular cutting tool on said shaft, means to supply water to said cutting tool during its rotation, a pair of lugs on said standard, a nonrotatable shaft shiftably mounted in said lugs as bearings, a head on said shaft, an article holding form on said head, a strap adapted to clamp an article on said form during the cutting operation one end of which is anchored to said head, an L-shaped lever carried by said head one end of which is connected to the opposite end of said strap, a foot pedal connected with the opposite end of said lever, an arm provided with teeth on said shaft, a tooth on said lever arranged to coöperate with said teeth for holding said lever in its operative position, and means for shifting said shaft and head toward and away from said cutting tool to bring an article carried by said form into operative relation with said tool.

In testimony whereof I have hereunto set my hand.

WESLEY E. WILSON.